United States Patent
Yamagishi et al.

(10) Patent No.: US 7,754,783 B2
(45) Date of Patent: Jul. 13, 2010

(54) RESIN-CONTAINING COMPOSITION, LIQUID APPLICATION METHOD AND LIQUID APPLICATION APPARATUS

(75) Inventors: Keiko Yamagishi, Ebina (JP); Koichi Sato, Atsugi (JP); Sakae Suda, Yokohama (JP); Tomoya Oku, Kawasaki (JP); Youhei Miyauchi, Kawasaki (JP); Takayuki Ookawa, Fukui (JP); Junko Chizuwa, Fukui (JP)

(73) Assignees: Canon Kabushiki Kaisha, Tokyo (JP); Canon Finetech Inc., Misato-shi (JP)

( * ) Notice: Subject to any disclaimer, the term of this patent is extended or adjusted under 35 U.S.C. 154(b) by 267 days.

(21) Appl. No.: 11/447,856

(22) Filed: Jun. 7, 2006

(65) Prior Publication Data

US 2006/0281853 A1 Dec. 14, 2006

(30) Foreign Application Priority Data

Jun. 9, 2005 (JP) .............................. 2005-170137

(51) Int. Cl.
*C09D 11/00* (2006.01)
*C08L 53/00* (2006.01)
*C08G 67/02* (2006.01)
*C08G 75/02* (2006.01)
*G01D 11/00* (2006.01)
*G01D 15/04* (2006.01)
*B41J 2/01* (2006.01)

(52) U.S. Cl. .................. 523/160; 523/161; 524/505; 524/612; 524/609; 347/1; 347/100; 346/78

(58) Field of Classification Search ................ 523/160, 523/161; 430/115, 114; 524/505, 612, 609; 347/1, 100; 346/78

See application file for complete search history.

(56) References Cited

U.S. PATENT DOCUMENTS 4,313,124 A 1/1982 Hara ..................... 346/140 R (Continued)

FOREIGN PATENT DOCUMENTS

JP S59-123670 7/1984
JP S59-138461 8/1984

(Continued)

OTHER PUBLICATIONS

Sadahito Aoshima et al., "Living Cationic Polymerization of Vinyl Monomers by Organoaluminum Halides", Polymer Bulletin, 15, 417-423 (1986).

*Primary Examiner*—Vasu Jagannathan
*Assistant Examiner*—Alexander C Kollias
(74) *Attorney, Agent, or Firm*—Fitzpatrick, Cella, Harper & Scinto

(57) ABSTRACT

Disclosed herein is a resin-containing composition comprising a solvent, a coloring material insoluble in the solvent and a block polymer compound having a repeating structural unit represented by the following general formula (1):

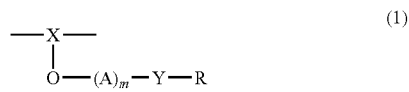

wherein X is a polyalkenyl group which may be substituted, A is a linear or branched alkylene group having 1 to 15 carbon atoms, which may be substituted, at least one $CH_2$ of the alkylene group may be substituted by O, m is an integer of from 0 to 30, the respective A groups may be different from each other when m is plural, Y is at least one of S, O and Se with the proviso that Y contains at least one S and that S, O and Se are each linked via a single bond, and R is a linear or branched alkyl group which may be substituted, an aromatic ring which may be substituted, or a structure in which at most 3 fused rings or aromatic rings, which may be substituted, are bonded via a single bond.

12 Claims, 1 Drawing Sheet

U.S. PATENT DOCUMENTS

| | | | |
|---|---|---|---|
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,085,698 A | 2/1992 | Ma et al. | 106/20 |
| 5,141,835 A * | 8/1992 | Kato et al. | 430/115 |
| 7,004,579 B2 | 2/2006 | Sato et al. | 347/105 |
| 7,056,972 B2 | 6/2006 | Nakazawa et al. | 524/505 |
| 7,067,590 B2 | 6/2006 | Sato et al. | 525/299 |
| 7,151,156 B2 | 12/2006 | Sato et al. | 528/86 |
| 7,232,211 B2 * | 6/2007 | Yamamoto et al. | 347/100 |
| 2005/0131102 A1 | 6/2005 | Nakazawa et al. | 523/160 |
| 2005/0140762 A1 | 6/2005 | Sato et al. | 347/100 |
| 2005/0197424 A1 | 9/2005 | Higashi et al. | 523/160 |
| 2005/0209367 A1 | 9/2005 | Sato et al. | 523/161 |
| 2005/0219277 A1 | 10/2005 | Sato et al. | 347/1 |
| 2005/0239918 A1 | 10/2005 | Nakazawa et al. | 523/160 |
| 2005/0249925 A1 | 11/2005 | Ikegami et al. | 428/195.1 |
| 2006/0004124 A1 | 1/2006 | Tsubaki et al. | 523/160 |
| 2006/0047015 A1 | 3/2006 | Duda et al. | 523/160 |
| 2006/0050117 A1 | 3/2006 | Sato et al. | 347/100 |
| 2006/0057485 A1 | 3/2006 | Teshima et al. | 430/108.8 |
| 2006/0100310 A1 | 5/2006 | Nakazawa et al. | 523/160 |
| 2006/0128828 A1 | 6/2006 | Sato et al. | 523/160 |
| 2006/0144287 A1 | 7/2006 | Tsubaki et al. | 106/31.13 |
| 2006/0146087 A1 | 7/2006 | Sato et al. | 347/21 |
| 2006/0148997 A1 | 7/2006 | Sato et al. | 525/299 |
| 2006/0160975 A1 | 7/2006 | Suda et al. | 526/330 |
| 2006/0178468 A1 | 8/2006 | Sato et al. | 524/556 |
| 2006/0221117 A1 | 10/2006 | Sato et al. | 347/21 |
| 2006/0235177 A1 | 10/2006 | Ikegami et al. | 526/287 |
| 2006/0250463 A1 | 11/2006 | Nakazawa et al. | 347/100 |
| 2007/0015856 A1 | 1/2007 | Sato et al. | 524/80 |
| 2007/0032570 A1 | 2/2007 | Sato et al. | 523/160 |
| 2007/0069183 A1 | 3/2007 | Sato et al. | 252/500 |
| 2007/0103525 A1 * | 5/2007 | Yamamoto et al. | 347/100 |

FOREIGN PATENT DOCUMENTS

| | | |
|---|---|---|
| JP | H11-080221 | 3/1999 |
| JP | H11-322866 | 11/1999 |
| JP | H11-322942 | 11/1999 |
| WO | WO/2004/058903 * | 7/2004 |
| WO | WO/2005/037937 * | 4/2005 |

* cited by examiner

FIGURE
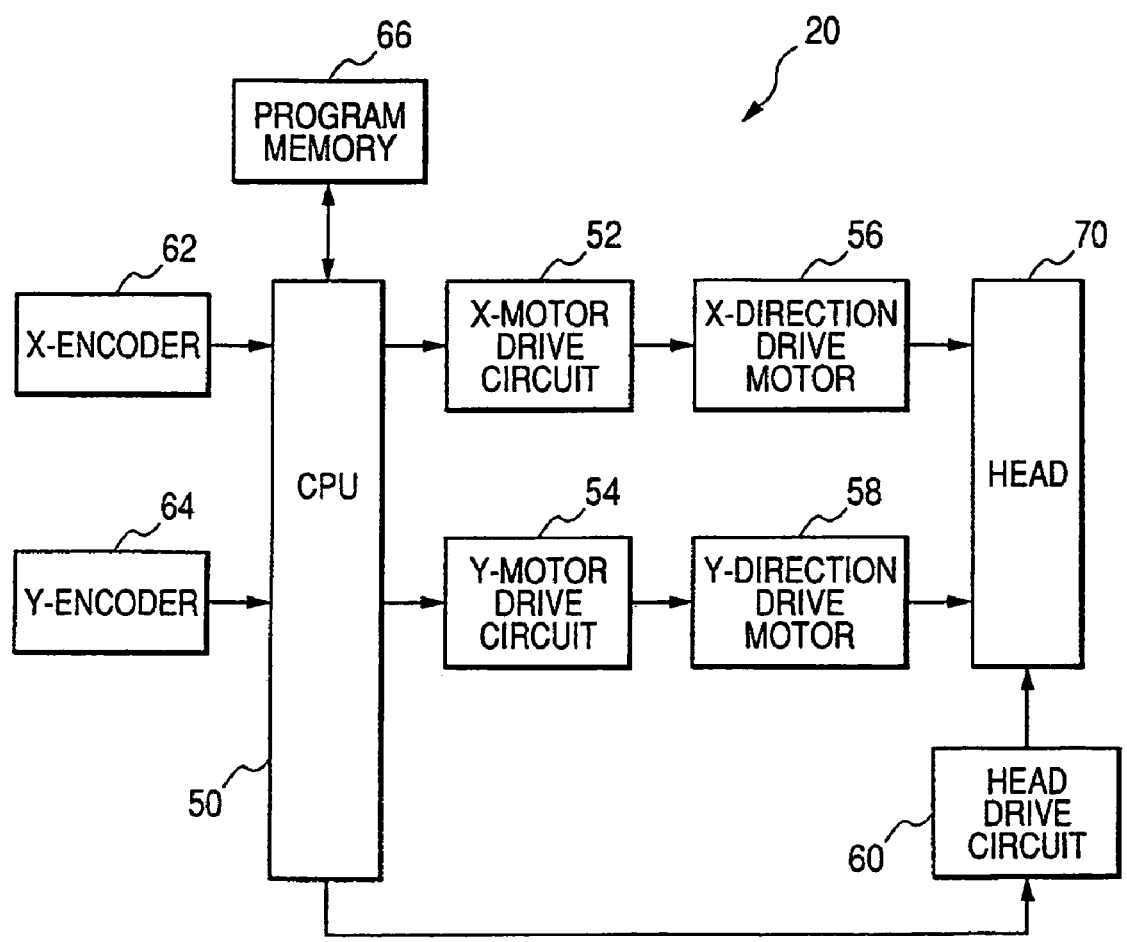

RESIN-CONTAINING COMPOSITION, LIQUID APPLICATION METHOD AND LIQUID APPLICATION APPARATUS

BACKGROUND OF THE INVENTION

1. Field of the Invention

The present invention relates to a resin-containing composition containing a novel polymer compound useful as various functional materials, a liquid application method and a liquid application apparatus, and particularly to an ink composition using such a compound together with a solvent and a coloring material, and a liquid application method and a liquid application apparatus using such a composition.

The polymer compound or block polymer compound as used in the present invention permits preparing an ink composition and a toner composition, which are excellent in storability and light fastness, so that such a polymer compound can be utilized for various kinds of liquid application methods and liquid application apparatus using recording materials such as the ink composition and toner composition.

2. Related Background Art

As aqueous dispersion materials containing functional substances, have been well known coloring materials containing a colorant, such as inks and toners. In recent years, digital printing technology has been very vigorously developed. Typical examples of this digital printing technology include those called electrophotographic technology and ink-jet technology, and its importance as image-forming technology in homes. and offices has more and more increased in recent years.

Among these, the ink-jet technology has a great feature as a direct recording method that it is compact and low in consumed power. Technological development toward high-quality images is also quickly advanced by the development of finer nozzles or the like. An example of the ink-jet technology is a method in which an ink fed from an ink tank is evaporated and bubbled by heating it by a heater in a nozzle, thereby ejecting the ink to form an image on a recording medium. Another example is a method in which an ink is ejected from a nozzle by vibrating a piezoelectric element.

Although aqueous dye solutions have been generally used as inks used in these ink-jet methods, it has been investigated in recent years to use pigment-dispersed inks from the viewpoints of water fastness and image density (U.S. Pat. No. 5,085,698). In any event, however, many improvements have been yet demanded for storability, particularly, light fastness or the like, under these circumstances.

SUMMARY OF THE INVENTION

The present invention has been made in view of the foregoing circumstances and has as its object the provision of a polymer compound or block polymer compound suitable for use in PREPARING an ink composition or toner composition excellent in storability and light fastness.

Another object of the present invention is to provide an ink composition and a toner composition excellent in storability and light fastness making use of the polymer compound or block polymer compound according to the present invention.

A further object of the present invention is to provide a liquid application method and a liquid application apparatus using a recording material such as the ink composition or toner composition.

The present inventors have carried out an extensive investigation as to the prior art and problems to be solved, thus leading to completion of the following invention.

In a first aspect of the present invention, there is thus provided a resin-containing composition comprising a solvent, a coloring material insoluble in the solvent and a block polymer compound having a repeating structural unit represented by the following general formula (1):

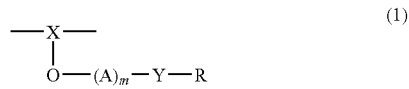

wherein X is a polyalkenyl group which may be substituted, A is a linear or branched alkylene group having 1 to 15 carbon atoms, which may be substituted, at least one $CH_2$ of the alkylene group may be substituted by O, m is an integer of from 0 to 30, the respective A groups may be different from each other when m is plural, Y is at least one of S, O and Se with the proviso that Y contains at least one S and that S, O and Se are each linked via a single bond, and R is a linear or branched alkyl group which may be substituted, an aromatic ring which may be substituted, or a structure in which at most 3 fused rings or aromatic rings, which may be substituted, are bonded via a single bond.

For the resin-containing composition, it is preferable that the block polymer compound has a hydrophobic block segment and a hydrophilic block segment, and the coloring material is included in the block polymer compound.

Further, the repeating structural unit represented by the general formula (1) may preferably be arranged in the hydrophobic block segment. The hydrophobic block segment may have a copolymer of the repeating structural unit represented by the general formula (1) and a repeating structural unit having an aromatic ring structure such as a phenyl group, biphenyl group or naphthyl group.

The coloring material may preferably be an oil-soluble dye.

In another aspect of the present invention, there is also provided a liquid application method comprising the steps of providing the resin-containing composition and applying the resin-containing composition to a recording medium.

The application of the resin-containing composition to the recording medium may preferably be conducted by an ink-jet head.

In a further aspect of the present invention, there is also provided a liquid application apparatus comprising a means for applying the resin-containing composition to a recording medium.

In a preferred embodiment of the present invention, the liquid application apparatus may preferably be a liquid application apparatus in which an ink is ejected from an ink-ejecting part to apply ink on to a recording medium, thereby conducting recording.

According to the present invention, a functional substance such as a pigment can be uniformly and stably dispersed in a solvent, and a resin-containing composition excellent in light fastness can be provided. According to the present invention, there can also be provided a liquid application method and a liquid application apparatus, which are suitable for use in applying this resin-containing composition.

The present invention can provide resin-containing compositions excellent in storability and light fastness, such as resin-containing ink compositions.

The present invention can also provide ink compositions and toner compositions excellent in storability and light fastness by using the polymer compound or block polymer compound described above.

Further, the present invention can provide liquid application methods and liquid application apparatus using recording materials such as the ink composition or toner composition described above.

BRIEF DESCRIPTION OF THE DRAWING

FIGURE is a block diagram showing the construction of an ink-jet recording apparatus.

DETAILED DESCRIPTION OF THE PREFERRED EMBODIMENTS

The present invention will hereinafter be described in detail.

The resin-containing composition according to the present invention comprises a solvent, a coloring material insoluble in the solvent and a block polymer compound having a repeating structural unit represented by the following general formula (1):

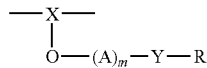
(1)

wherein X is a polyalkenyl group which may be substituted, A is a linear or branched alkylene group having 1 to 15 carbon atoms, which may be substituted, at least one $CH_2$ of the alkylene group may be substituted by O, m is an integer of from 0 to 30, the respective A groups may be different from each other when m is plural, Y is at least one of S, O and Se with the proviso that Y contains at least one S and that S, O and Se are each linked via a single bond, and R is a linear or branched alkyl group which may be substituted, an aromatic ring which may be substituted, or a structure in which at most 3 fused rings or aromatic rings, which may be substituted, are bonded via a single bond.

In the general formula (1), examples of the alkyl group include propyl, isopropyl, butyl and t-butyl groups. Examples of the aromatic ring include phenyl, naphthyl, pyridyl and biphenyl groups. Examples of the substituent groups include alkyl and alkoxy groups.

Incidentally, in the present invention, the polymer compound means a compound having at least 10 repeating units composed of a low-molecular compound, and the block polymer compound means a polymer compound having at least 2 block segments.

Preferable examples of the repeating structural unit represented by the general formula (1) include repeating structural units represented by the following general formula (2):

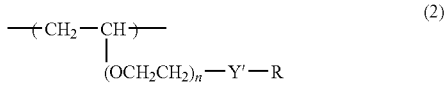
(2)

wherein Y' is at least one of S or Se, with the proviso that Y' contains at least one S, R is a linear or branched alkyl group having 3 to 15 carbon atoms, which may be substituted, an aromatic ring which may be substituted, or a structure in which at most 3 fused rings or aromatic rings, which may be substituted, are bonded via a single bond, and n is an integer of from 1 to 15. Examples of the alkyl group include propyl, isopropyl, butyl and t-butyl groups. Examples of the aromatic ring include phenyl, naphthyl, pyridyl and biphenyl groups. Examples of the substituent groups include alkyl and alkoxy groups.

Specific examples of the repeating structural unit represented by the general formula (2) include the following structures. However, the present invention is not limited thereto.

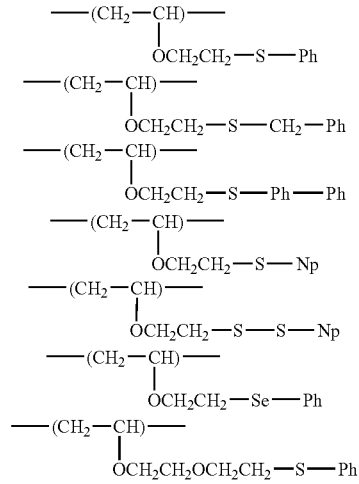

wherein Ph is a phenyl group, and Np is a naphthyl group.

The polymer compound and block polymer compound according to the present invention have the feature that a repeating unit having at least one sulfide bond as represented by the general formula (1) is contained in the repeating unit of the block polymer, and are extremely useful in that functional polymer materials having good storability and light fastness can be provided.

With respect of the mechanism of light fastness in the present invention, the present inventors think that the effect of light fastness is developed by, particularly, the sulfide bond portion in the block polymer compound. More specifically, sulfur is homologous with oxygen, but has a 3d orbital and can increase its valence from ordinal bivalence to tetravalence or hexavalence to form various compounds exhibiting characteristic reactivity. Its bonding strength is high due to the contribution of 3d orbital resonance. For example, the oxygen-oxygen bond is 48 kcal for hydrogen peroxide (HO—OH) or 32 kcal for diethyl peroxide (EtO—OEt), whereas disulfide bond is as high as 72 kcal for hydrogen disulfide (HS—SH) and diethyl disulfide (EtS—SEt). It is inferred that such a strong bond is hard to be severed by light, i.e., hard to be deteriorated.

It is also inferred that when the valence of sulfur is small, the number of vacant orbitals increases, and so the contribution of 3d orbital resonance also becomes great.

A preferred mode of the block polymer compound according to the present invention is an amphiphilic block polymer compound. The amphiphilicity means that a compound has both natures of solvent compatibility and solvent repellency, and the amphiphilic block polymer compound is a polymer compound having at least one solvent compatible block segment and at least one solvent repellent block segment. The solvent compatibility means a nature that affinity for principal solvents used in a polymer-containing composition, which will be described subsequently, is high, while the solvent repellency means a nature that affinity for the solvents is low.

It is preferable that the solvent be water, and at least one solvent compatible block segment and at least one solvent repellent block segment be contained in the block polymer compound according to the present invention.

The amphiphilicity is developed from the condition where at least one block segment of the block polymer compound according to the present invention is hydrophobic, and at least one block segment thereof is hydrophilic. Incidentally, the hydrophilicity means a nature that affinity for water is high, and such a compound is easily dissolved in water, while the hydrophobicity means a nature that affinity for water is low, and such a compound is hardly dissolved in water. Examples of a hydrophilic block include block segments containing a repeating structural unit having a carboxylic, carboxylate, hydrophilic oxyethylene unit, hydroxyl group or the like. However, the present invention is not limited thereto.

Examples of a hydrophobic block include block segments containing a hydrophobic repeating structural unit having an aromatic ring structure. Specific examples thereof include block segments having, as a repeating unit, a hydrophobic monomer such as styrene or phenyl acrylate, with block segments having a repeating structural unit composed of a polyalkenyl ether structure being preferred.

Specific examples of the repeating structural unit, which becomes a hydrophobic block, include the following units. However, the present invention is not limited thereto.

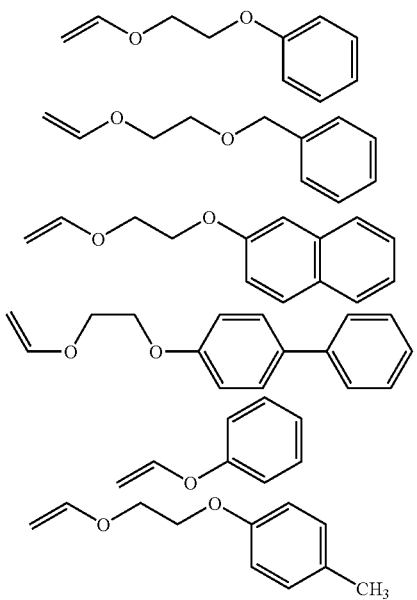

Each block segment in the block polymer compound according to the present invention may be composed of a repeating unit derived from a single monomer or may be a structure having a repeating unit derived from a plurality of monomers. Examples of the block segment having the repeating unit derived from a plurality of monomers include random copolymers and gradient copolymers in which the compositional ratio is gradually changed. The block polymer compound according to the present invention may be a polymer in which such a block polymer as described above is graft-bonded to another polymer. Such a repeating unit containing at least one sulfide bond in the repeating unit of the block polymer as represented by the general formula (1) is preferably arranged in the hydrophobic block segment that is an adsorption segment on a coloring material in the block polymer from the viewpoint of light fastness. The whole hydrophobic block segments may be the repeating structure of the general formula (1). Alternatively, it may be a copolymer with a repeating structural unit of an aromatic ring structure having high affinity for a coloring material, for example, a phenyl group, a biphenyl group and a naphthyl group.

In the present invention, the content of the repeating structural unit represented by the general formula (1) contained in the polymer compound or block polymer compound is desirably within a range of from 0.01 to 99 mol %, preferably from 1 to 90 mol %. If the content is lower than 0.01 mol %, the dispersion stability of a functional substance may be deteriorated in some cases. If the content exceeds 99 mol %, it is hard to form a structure that a functional substance is effectively included. It is hence not preferable to contain the repeating structural unit in such a too low or too high content.

The number average molecular weight (Mn) of the polymer compound or block polymer compound according to the present invention is within a range of from 400 to 10,000,000, preferably from 1,000 to 1,000,000. If the molecular weight exceeds 10,000,000, entanglement within a polymer chain and between polymer chains becomes too much, and so such a polymer may be hard to be dispersed in a solvent. If the molecular weight is lower than 400, the molecular weight may be too low to exhibit a three-dimensional effect as a polymer. A preferable polymerization degree of each block segment is from 2 to 10,000, preferably from 2 to 5,000, more preferably from 2 to 4,000.

The polymerization of the polymer compound or block polymer compound according to the present invention is often mainly conducted by cationic polymerization. Examples of an initiator include combinations of a protonic acid such as hydrochloric acid, sulfuric acid, methanesulfonic acid, trifluoroacetic acid, trifluoromethanesulfonic acid or perchloric acid, or a Lewis acid such as $BF_3$, $AlCl_3$, $TiCl_4$, $SnCl_4$, $FeCl_3$, $RAlCl_2$ or $R_{1.5}AlCl_{1.5}$ (R is alkyl) with a cation source (examples of the cation source include protonic acids, water, alcohols and adducts of vinyl ether and a carboxylic acid). Polymerization reaction is allowed to progress by causing these initiators to coexist with polymerizable compounds (monomers), whereby the polymer compound can be synthesized.

A polymerization process more preferably used in the present invention will be described. Many synthesizing processes for a polymer containing a polyvinyl ether structure have been reported (for example, Japanese Patent Application Laid-Open No. H11-080221). Processes according to cationic living polymerization by Aoshima, et al. (Journal of Polymer Bulletin, Vol. 15, p. 417, 1986; and Japanese Patent Application Laid-Open Nos. H11-322942 and H11-322866) are representative thereof By conducting polymer synthesis according to the cationic living polymerization, various polymers such as homopolymers, copolymers composed of two or more monomers, block polymers, graft polymers and gradient polymers can be synthesized with their chain lengths (molecular weights) made exactly uniform. Besides, living polymerization may also be conducted in an $HI/I_2$ system, $HCl/SnCl_4$ system or the like.

The polymer-containing composition according to the present invention will now be described.

The polymer-containing composition comprises the polymer compound or block copolymer compound according to the present invention, a solvent and a functional substance.

The polymer-containing composition according to the present invention preferably contains the polymer compound, a coloring material and a functional substance exhibiting a useful prescribed function. The block copolymer can be suitably used for well dispersing the coloring material, functional substance and the like. As the functional substance, may also be used a pigment, metal, herbicide, insecticide, biological material, for example, a drug, or the like. The polymer compound according to the present invention may be well used as a water-soluble polymer compound and also used as an adhesive and a pressure sensitive adhesive, so that no functional substance may be necessary.

The functional substance used in the composition according to the present invention is preferably contained in a proportion of from 0.1 to 50% by mass, particularly from 0.5 to 10% by mass based on the mass of the composition according to the present invention. The functional substance may be a soluble substance, and a dye, molecular catalyst or the like may also be used.

The content of the polymer compound according to the present invention contained in the composition according to the present invention is preferably from 0.5 to 10% by mass based on the mass of the composition according to the present invention.

As an example of the composition according to the present invention, is mentioned a recording material comprising a solvent, a coloring material and the polymer compound according to the present invention.

Specific examples of the recording material include toner compositions comprising a dispersion medium such as a binder resin, a coloring material and the polymer compound according to the present invention.

Ink compositions comprising a solvent, a coloring material and the polymer compound according to the present invention may also be mentioned.

An ink composition, which is a preferred embodiment of the present invention, will now be described.

The content of the polymer compound contained in the ink composition according to the present invention is within a range of from 0.1% by mass to 90% by mass, preferably from 1% by mass to 80% by mass. When the ink composition is used for ink-jet printers, the polymer compound is preferably used in an amount of from 1% by mass to 30% by mass.

Other components than the polymer compound contained in the ink composition according to the present invention will hereinafter be described. The other components include organic solvents, water, aqueous solvents, coloring materials, additives, etc.

[Organic Solvent]

Examples of the organic solvents include hydrocarbon solvents, aromatic solvents, ether solvents, ketone solvents, ester solvents and amide solvents.

[Water]

Water contained in the ink composition according to the present invention is preferably ion-exchanged water from which metal ions and the like are removed, pure water or ultra pure water.

[Aqueous Solvent]

Examples of usable aqueous solvents include polyhydric alcohols such as ethylene glycol, diethylene glycol, triethylene glycol, polyethylene glycol, propylene glycol, polypropylene glycol and glycerol, polyhydric alcohol ethers such as ethylene glycol monomethyl ether, ethylene glycol monoethyl ether, ethylene glycol monobutyl ether, diethylene glycol monoethyl ether and diethylene glycol monobutyl ether, and nitrogen-containing solvents such as N-methyl-2-pyrrolidone, substituted pyrrolidone and triethanolamine. In order to accelerate drying of the aqueous dispersion on a recording medium, a monohydric alcohol such as methanol, ethanol or isopropanol may also be used.

The overall content of the organic solvent, water and the aqueous solvent in the ink composition according to the present invention is preferably within a range of from 20 to 95% by mass, more preferably from 30 to 90% by mass based on the total mass of the ink composition.

[Coloring Material]

When the coloring material in the ink composition according to the present invention is an oil-soluble dye, the effect of the present invention becomes considerable. However, the effect may be exhibited even when a pigment or the like is used.

Specific examples of dyes and pigments used in ink compositions are mentioned below.

As examples of oil-soluble dyes, commercially available products of various colors are mentioned below. However, oil-soluble dyes newly synthesized for the present invention may also be used.

As examples of oil-soluble dyes of black, may be mentioned C.I. Solvent Black -3, -5, -6, -7, -8, -13, -22, -22:1, -23, -26, -27, -28, -29, -33, -34, -35, -39, -40, -41, -42, -43, -45, -46, -47, -48, -49 and -50. However, the present invention is not limited thereto.

As examples of oil-soluble dyes of yellow, may be mentioned C.I. Solvent Yellow -1, -2, -3, -4, -6, -7, -8, -10, -12, -13, -14, -16, -18, -19, -21, -25, -25:1, -28, -29, -30, -32, -33, -34, -36, -37, -38, -40, -42, -43, -44, -47, -48, -55, -56, -58, -60, -62, -64, -65, -72, -73, -77, -79, -81, -82, -83, -83:1, -85, -88, -89, -93, -94, -96, -98, -103, -104, -105, -107, -109, -112, -114, -116, -117, -122, -123, -124, -128, -129, -130, -131, -133, -134, -135, -138, -139, -140, -141, -143, -146, -147, -148, -149, -150, -151, -152, -153, -157, -158, -159, -160:1, -161, -162, -163, -164, -165, -167, -168, -169, -170, -171 and -172. However, the present invention is not limited thereto.

As examples of oil-soluble dyes of orange, may be mentioned C.I. Solvent Orange -1, -2, -3, -4, -4:1, -5, -6, -7, -11, -16, -17, -19, -20, -23, -25, -31, -32, -37, -37:1, -38, -40, -40:1, -41, -45, -54, -56, -59, -60, -62, -63, -67, -68, -71, -72, -73, -74, -75, -76, -77, -79, -80, -81, -84, -85, -86, -91, -94, -95, -98 and -99. However, the present invention is not limited thereto.

As examples of oil-soluble dyes of red, may be mentioned C.I. Solvent Red -1, -2, -3, -4, -7, -8, -13, -14, -17, -18, -19, -23, -24, -25, -26, -27, -29, -30, -33, -35, -37, -39, -41, -42, -43, -45, -46, -47, -48, -49, -49:1, -52, -68, -69, -72, -73, -74, -80, -81, -82, -83, -83:1, -84, -84:1, -89, -90, -90:1, -91, -92, -106, -109, -111, -117, -118, -119, -122, -124, -125, -127, -130, -132, -135, -138, -140, -143, -145, -146, -149, -150, -151, -152, -155, -160, -164, -165, -166, -168, -169, -172, -175, -176, -177, -179, -180, -181, -182, -185, -188, -189, -195, -198, -202, -203, -204, -205, -206, -207, -208, -209, -210, -212, -213, -214, -215, -216, -217, -218, -219, -220, -221, -222, -223, -224, -225, -226, -227, -228 and -229. However, the present invention is not limited thereto.

As examples of oil-soluble dyes of violet, may be mentioned C.I. Solvent Violet -2, -3, -8, -9, -10, -11, -13, -14, -21, -21:1, -24, -31, -32, -33, -34, -36, -37, -38, -45, -46 and -47. However, the present invention is not limited thereto.

As examples of oil-soluble dyes of blue, may be mentioned C.I. Solvent Blue -2, -4, -5, -7, -10, -11, -12, -14, -22, -25, -26, -35, -36, -37, -38, -43, -44, -45, -48, -49, -50, -51, -59, -63, -64, -66, -67, -68, -70, -72, -79, -81, -83, -91, -94, -95, -97, -98, -99, -100, -102, -104, -105, -111, -112, -116, -117, -118, -122, -127, -128, -129, -130, -131, -132, -133 and -134. However, the present invention is not limited thereto.

As examples of oil-soluble dyes of green, may be mentioned C.I. Solvent Green -1, -3, -4, -5, -7, -8, -9, -20, -26, -28, -29, -30, -32 and -33. However, the present invention is not limited thereto.

As examples of oil-soluble dyes of brown, may be mentioned C.I. Solvent Brown -1, -1:1, -2, -3, -4, -5, -6, -12, -19, -20, -22, -25, -28, -29, -31, -37, -38, -42, -43, -44, -48, -49, -52, -53 and -58. However, the present invention is not limited thereto.

Incidentally, these examples of the coloring materials described above are particularly preferred for the ink compositions according to the present invention. However, the coloring materials usable in the ink compositions according to the present invention are not particularly limited to the above coloring materials.

The dye used in the ink composition according to the present invention is preferably contained in an amount of from 0.1 to 50% by mass based on the mass of the ink composition. If the amount of the dye is less than 0.1% by mass, sufficient image density may not be achievable. If the amount exceeds 50% by mass, the dye aggregates to fail to be dispersed. A more preferable range is a range of from 0.5 to 30% by mass.

The pigments usable in the ink compositions according to the present invention may be either organic pigments or inorganic pigments. Pigments newly synthesized for the present invention may also be used.

Examples of commercially available pigments in black, cyan, magenta and yellow are mentioned below.

As examples of black pigments, may be mentioned Raven 1060, Raven 1080,. Raven 1170, Raven 1200, Raven 1250, Raven 1255, Raven 1500, Raven 2000, Raven 3500, Raven 5250, Raven 5750, Raven 7000, Raven 5000 ULTRA II and Raven 1190 ULTRA II (products of Columbian Carbon Co.), Black Pearls L, MOGUL-L, Regal 400R, Regal 660R, Regal 330R, Monarch 800, Monarch 880, Monarch 900, Monarch 1000, Monarch 1300 and Monarch 1400 (products of Cabot Company), Color Black FW1, Color Black FW2, Color Black FW200, Color Black 18, Color Black S160, Color Black S170, Special Black 4, Special Black 4A, Special Black 6, Printex 35, Printex U, Printex 140U, Printex V and Printex 140V (products of Degussa AG), and No. 25, No. 33, No. 40, No. 47, No. 52, No. 900, No. 2300, MCF-88, MA600, MA7, MA8 and MA100 (products of Mitsubishi Chemical Corporation). However, the present invention is not limited thereto.

As examples of cyan pigments, may be mentioned C.I. Pigment Blue-1, C.I. Pigment Blue-2, C.I. Pigment Blue-3, C.I. Pigment Blue-15, C.I. Pigment Blue-15:2, C.I. Pigment Blue-15:3, C.I. Pigment Blue-15:4, C.I. Pigment Blue-16, C.I. Pigment Blue-22 and C.I. Pigment Blue-60. However, the present invention is not limited thereto.

As examples of magenta pigments, may be mentioned C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184, C.I. Pigment Red-202 and C.I. Pigment Red-207. However, the present invention is not limited thereto.

As examples of yellow pigments, may be mentioned C.I. Pigment Yellow-12 C.I. Pigment Yellow-13, C.I. Pigment Yellow-14, C.I. Pigment Yellow-16, C.I. Pigment Yellow-17, C.I. Pigment Yellow-74, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154. However, the present invention is not limited thereto.

Pigments self-dispersible in water may also be used in the ink compositions according to the present invention. The pigments dispersible in water include those making good use of steric hindrance by adsorbing a polymer on the surface of a pigment and those making good use of electrostatic repulsion force. Examples of commercially available self-dispersible pigments include CAB-O-JET200 and CAB-O-JET300 (products of Cabot Company), and Microjet Black CW-1 (product of Orient Chemical Industries Ltd.).

The pigment used in the ink composition according to the present invention is preferably contained in an amount of from 0.1 to 30% by mass based on the mass of the ink composition. If the amount is less than 0.1% by mass, sufficient image density may not be achieved. If the amount exceeds 30% by mass, the pigment aggregates to fail to be dispersed. A more preferable range of the amount is from 0.5 to 20% by mass.

[Additive]

To the composition according to the present invention, various additives and auxiliary agents may be added as needed. An example of the additives includes a dispersion stabilizer, by which a pigment is stably dispersed in a solvent. The composition according to the present invention has a function of dispersing a particulate solid such as a pigment by virtue of a polymer having the polyvinyl ether structure. However, any other dispersion stabilizer may be added when dispersion is insufficient.

As other dispersion stabilizers, may be used resins or surfactants having both hydrophilic portion and hydrophobic portion. Examples of the resin having both hydrophilic portion and hydrophobic portion include copolymers of a hydrophilic monomer and a hydrophobic monomer.

Examples of the hydrophilic monomer include acrylic acid, methacrylic acid, maleic acid, fumaric acid, monoesters of the carboxylic acids described above, vinylsulfonic acid, styrenesulfonic acid, vinyl alcohol, acrylamide and methacryloxyethyl phosphate. Examples of the hydrophobic monomer include styrene, styrene derivatives such as α-methylstyrene, vinylcyclohexane, vinylnaphthalene derivatives, acrylic acid esters and methacrylic acid esters. The copolymer may be in any form of random, block and graft copolymers. Both hydrophilic monomers and hydrophobic monomers are not limited to those described above.

As the surfactants, may be used anionic, nonionic, cationic and amphoteric surfactants. Examples of the anionic surfactants include fatty acid salts, alkylsulfate salts, alkylarylsulfonic acid salts, alkyl diaryl ether disulfonic acid salts, dialkylsulfosuccinic acid salts, alkylphosphonic acid salts, naphthalenesulfonic acid-formalin condensates, polyoxyethylene alkyl phosphate salts and glycerol borate fatty acid esters. Examples of the nonionic surfactants include polyoxyethylene alkyl ethers, polyoxyethylene-oxypropylene block copolymers, sorbitan fatty acid esters, glycerol fatty acid esters, polyoxyethylene fatty acid esters, polyoxyethylene alkylamines, fluorine-containing surfactants and silicon-containing surfactants. Examples of the cationic surfactants include alkylamine salts, quaternary ammonium salts, alkylpyridinium salts and alkylimidazolium salts. Examples of the amphoteric surfactants include alkylbetaines, alkylamine oxides and phosphatidylcholine. Incidentally, the surfactants are also not limited to those described above.

To the composition according to the present invention, may be added an aqueous solvent as needed. When the composition is used as an ink-jet ink in particular, the aqueous solvent is used for the purpose of preventing drying of the ink in a nozzle part and solidification of the ink in the nozzle part. The aqueous solvents may be used either singly or in any combination thereof. As the aqueous solvents, those mentioned above are all usable. When the composition is an ink, the content of the aqueous solvent is within a range of from 0.1 to 60% by mass, preferably from 1 to 40% by mass based on the total mass of the ink.

When the composition is used as, for example, an ink, pH adjustors for achieving stabilization of the ink and stability of the ink with respect to piping in a recording apparatus, penetrants for accelerating penetration of the ink into a recording medium to facilitate apparent drying, mildewproofing agents for preventing occurrence of mildew in the ink, chelating agents for blocking metal ions in the ink to prevent deposition of metals in the nozzle part and deposition of insoluble matter in the ink, antifoaming agents for preventing occurrence of foams upon circulation, transferring or preparation of a recording liquid, and besides, antioxidants, viscosity modifiers, and conductivity-imparting agents may also be added as other additives.

The ink composition according to the present invention can be prepared by mixing the constituent components described above and uniformly dissolving or dispersing the resultant mixture. For example, a plurality of the constituent components are uniformly mixed, the resultant mixture is pulverized and dispersed by means of a sand mill, ball mill, homogenizer, nanomizer or the like to prepare an ink mother liquor, and a solvent and additives are added to this liquor to adjust its physical properties, whereby the ink composition can be prepared.

The liquid application method and liquid application apparatus making use of the composition according to the present invention will now be described.

[Liquid Application Method and Liquid Application Apparatus]

The composition according to the present invention can be used in various liquid application methods such as various kinds of printing methods, ink-jet methods and electrophotographic methods, and in various liquid application apparatus, and an image can be formed by a liquid application method using such a liquid application apparatus. When a liquid composition is used, it may be used for forming a minute pattern by an ink-jet method or the like, or in a liquid application method for administering a drug.

The liquid application method according to the present invention is a method for forming an excellent image with the composition according to the present invention. The liquid application method according to the present invention is preferably a liquid application method comprising ejecting the ink composition according to the present invention from an ink ejection part to apply the ink composition on to a recording medium, thereby conducting recording. In the formation of the image, is preferably used a method using an ink-jet system in which thermal energy is applied to an ink to eject the ink.

As an ink-jet printer using the ink-jet ink composition according to the present invention, may be applied various ink-jet recording apparatus of a piezoelectric ink-jet system using a piezoelectric element, a thermal ink-jet system in which thermal energy is applied to an ink to form bubbles in the ink, thereby conducting recording, and the like.

This ink-jet recording apparatus will hereinafter be schematically described with reference to FIGURE. However, FIGURE merely shows an example of the construction, which by no means limits the present invention.

FIGURE is a block diagram illustrating the construction bf the ink-jet recording apparatus.

FIGURE shows a case in which a head is made to move to perform recording on a recording medium. In FIGURE, to CPU 50 which controls the whole motion of the recording apparatus, an X-direction drive motor 56 for driving a head 70 in an X direction and a Y-direction drive motor 58 for driving the head 70 in a Y direction are connected-through an X-motor drive circuit 52 and a Y-motor drive circuit 54, respectively. According-to instructions from the CPU, the X-direction drive motor 56 and the Y-direction drive motor 58 are driven through the X-motor drive circuit 52 and the Y-motor drive circuit 54, respectively, thereby determining a position of the head 70 to a recording medium.

As illustrated in FIGURE, a head drive circuit 60 is connected to the head 70 in addition to the X-direction drive motor 56 and the Y-direction drive motor 58, the CPU 50 controls the head drive circuit 60 to drive the head 70, i.e., to eject an ink-jet ink. Both X-encoder 62 and Y-encoder 64 for detecting the position of the head are connected to the CPU 50 to input positional information of the head 70 therein. A control program is also inputted in a program memory 66. The CPU 50 moves the head 70 on the basis of this control program and the positional information from the X-encoder 62 and Y-encoder 64 to arrange the head 70 at a desired position on the recording medium so as to eject the ink-jet ink. In such a manner, a desired image can be formed on the recording medium. In the case of an image forming apparatus, in which plural ink-jet inks can be charged, a desired image can be formed on a recording medium by conducting such operation as described above prescribed times in respect to the respective ink-jet inks.

After the ink-jet ink is ejected, as needed, the head 70 may be moved to a position where a removing means (not illustrated) for removing excessive ink attached to the head 70 is arranged, to clean the head 70 by wiping or the like. As a specific method for cleaning, a conventional method may be used as it is.

After completion of the formation of the image, the recording medium, on which the image has been formed, is replaced by a new recording medium by means of a recording-medium-conveying mechanism (not illustrated).

Incidentally, in the present invention, the above-described embodiment can be modified or changed so far as such modification or the like does not depart from the gist of the invention. For example, the embodiment in which the head 70 is moved in the directions of X-Y axes has been described above. However, the head 70 may be moved only in the X-axis direction (or Y-axis direction), and the recording medium may be moved in the Y-axis direction (or X-axis direction), thereby forming an image while interlocking these movements.

For the present invention, a head equipped with a means for generating thermal energy as energy used for ejection of an ink-jet ink (for example, electrothermal converter or laser beam) to eject the ink-jet ink by the thermal energy brings about excellent effects. According to such system, the formation of a high-definition image can be achieved. The formation of a far excellent image can be achieved by using the ink-jet ink compositions according to the present invention.

With respect to the typical construction and principle of the apparatus equipped with the means for generating thermal energy, those using the basic principle disclosed in, for example, U.S. Patent Nos. 4,723,129 and 4,740,796 are preferred. This system may be applied to any of the so-called On-Demand type and continuous type. In particular, the On-Demand type is effective because at least one driving signal which corresponds to ejection information and gives a rapid temperature rise exceeding nucleate boiling is applied to an electrothermal converter arranged corresponding to a liquid path, in which a liquid is retained, thereby causing the electrothermal converter to generate thermal energy to cause film boiling on the heat-acting surface of a head, so that a bubble can be formed in the liquid in response to the driving signal in relation of one to one. The liquid is ejected through an ejection opening by the growth-contraction of this bubble to form at least one droplet. When the driving signal is applied in the form of a pulse, the growth-contraction of the bubble is suitably conducted in a moment, so that the ejection of the liquid with excellent responsiveness in particular can be achieved. It is therefore preferable to use such pulsed signals. As the pulsed driving signal, such signals as described in U.S. Pat. Nos. 4463,359 and 4,345,262 are suitable. When the conditions as described in U.S. Pat. No. 4,313,124 that discloses an invention relating to the rate of temperature rise on the heat-acting surface are used, far excellent ejection can be conducted.

As the construction of the head, such combined constructions (linear liquid flow path or perpendicular liquid flow path) of ejection openings, a liquid flow path and electrothermal converters as disclosed in the above-described publications, and besides constructions based on U.S. Pat. Nos. 4,558,333 and 4,459,600 which disclose the construction in which a heat-acting portion is arranged in a curved region may also be included in the present invention. In addition, constructions based on Japanese Patent Application Laid-Open No. S59-123670 which discloses the construction in which a slit common to a plurality of electrothermal converters are used as an ejection part of the electrothermal converters, and Japanese Patent Application Laid-Open No. S59-138461 which discloses the construction in which an opening which absorbs a pressure wave of thermal energy is provided in opposition to an ejection part may also be effective for the present invention. In other words, ejection of the ink-jet ink can be efficiently performed with certainty according to the present invention even when the head is of any type.

Further, in the liquid application apparatus as used for the present invention, the composition of the present invention can be effectively applied to a full-line type head having a length corresponding to the longest width of a recording medium. Such a head may be either of the construction in which the length is satisfied by a combination of plural recording heads or of the construction comprised of one recording head integrally formed.

In addition, the present invention is effective even in a serial type head so far as the head is fixed to an apparatus body, or even when a replaceable, chip type head, in which electrical connection to an apparatus body and the feed of an ink from the apparatus body become feasible by installing the head in the apparatus body, is used.

Further, the apparatus according to the present invention may additionally have a droplet removing means. When such a means is added, a far excellent ejecting effect can be realized.

Still further, addition of preliminary auxiliary means and the like which are provided as constitution of the apparatus according to the present invention is preferred because the effects of the present invention can be more stabilized. As specific examples thereof, may be mentioned capping means for the head, pressurizing or sucking means, preliminary heating means for conducting heating by using electrothermal converters, other heating elements than these or combinations thereof, and preliminary ejecting means for conducting ejection separate from ejection of an ink.

The ink compositions according to the present invention may also be used in indirect recording apparatus making use of a recording system that an ink is applied to an intermediate transfer material, and the applied ink is then transferred to a recording medium such as paper. Further, the ink compositions may also be applied to apparatus making use of an intermediate transfer material handled by a direct recording system.

The present invention will hereinafter be described in detail by the following Examples. However, the present invention is not limited to these examples.

EXAMPLE 1

<Synthesis of ABC triblock copolymer, PTVE 80-b-MEVE 40-b-BAVE 20, comprised of 2-(phenylthio)ethyl vinyl ether (PTVE; block A), diethylene glycol methyl vinyl ether (MEVE; block B) and ethyl 4-(2-vinyloxyethoxy)benzoate (BAVE; block C) (here, b is a symbol indicating a block polymer)>

After the interior of a glass container equipped with a three-way stop-cock was purged with nitrogen, the container was heated to 250° C. under a nitrogen gas atmosphere to remove adsorbed water. After the system was returned to room temperature, 400 mmol of PTVE, 761 mmol of ethyl acetate, 4.95 mmol of 1-isobutoxyethyl acetate and 490 ml of toluene were added to cool the reaction system. At the time the temperature within the system reached 0° C., 10 mmol of ethylaluminum sesquichloride (equimolar mixture of diethylaluminum chloride and ethylaluminum dichloride) was added to initiate polymerization. The molecular weight was periodically monitored by means of gel permeation chromatography (GPC). At the time the polymerization degree of the block A reached 80, a toluene solution of 33 mmol of MEVE was added to continue polymerization. Monitoring by means of GPC was conducted, and at the time the polymerization degree of the block B reached 40, a toluene solution of 90 mmol of BAVE was added to continue polymerization. Monitoring by means of GPC was conducted to terminate the polymerization reaction at the time the polymerization degree of the block C reached about 20. The termination of the polymerization reaction was conducted by adding a 0.3% by mass aqueous solution of ammonia/methanol into the system.

The reaction mixture solution was concentrated, diluted with dichloromethane and washed 3 times with 0.6 M hydrochloric acid, once with an aqueous alkali solution and then 3 times with distilled water. The resultant organic phase was concentrated by an evaporator, and the resultant concentrated product was dissolved in tetrahydrofuran and dialyzed repeatedly in a methanol solvent using a semi-permeable membrane composed of cellulose to remove the monomers, thereby obtaining the intended triblock polymer. The identification of the compound was conducted by means of NMR and GPC. Mn was 24,000, and Mw/Mn was 1.21. The polymerization ratio of PTVE:MEVE:BAVE was 80:40:20.

The thus-obtained polymer compound was stirred together with a 5N aqueous solution of sodium hydroxide for 40 hours at room temperature (23° C.) to hydrolyze the ester. After the thus-treated compound was neutralized with 0.1N hydrochloric acid and extracted with methylene chloride, the solvent was distilled off to obtain a polymer in the form of a free carboxylic acid.

In 21 parts by weight of tetrahydrofuran (THF) was dissolved 2.4 parts by weight of the resultant polymer in the form of a free carboxylic acid, and 1.8 parts by weight of Oil Yellow 129 (fat-soluble dye, product of Orient Chemical Industries Ltd.) was dissolved in 18 parts by weight of THF. These solutions were put together and converted into an aqueous phase by using 1.6 parts by weight of 1N sodium hydroxide and 34 parts by weight of water. THF was distilled off. As a result, dispersion was successfully conducted. The dispersion was filtered under pressure through a filter having a pore size of 2 μm to obtain a dispersed material aqueous solution.

EXAMPLE 2

<Synthesis of ABC triblock copolymer, (PTVE 40-r-PhOVE 40)-b-MEVE 40-b-BAVE 20, comprised of 2-(phenylthio)ethyl vinyl ether (PTVE; block A), 2-vinyloxyethoxybenzene (PhOVE; block A), diethylene glycol methyl vinyl ether (MEVE; block B) and ethyl 4-(2-vinyloxyethoxy)benzoate (BAVE; block C) (here, r and b are symbols indicating a random polymer and a block polymer, respectively)>

After the interior of a glass container equipped with a three-way stop-cock was purged with nitrogen, the container was heated to 250° C. under a nitrogen gas atmosphere to remove adsorbed water. After the system was returned to room temperature, 220 mmol of PTVE, 220 mmol of PhOVE, 761 mmol of ethyl acetate, 4.95 of 1-isobutoxyethyl acetate and 490 ml of toluene were added to cool the reaction system. At the time the temperature within the system reached 0° C., 10 mmol of ethylaluminum sesquichloride (equimolar mixture of diethylaluminum chloride and ethylaluminum dichloride) was added to initiate polymerization. The molecular weight was periodically monitored by means of gel permeation chromatography (GPC). At the time the polymerization degree of the block A reached 80, a toluene solution of 194 mmol of MEVE was added to continue polymerization. Monitoring by means of GPC was conducted, and at the time the polymerization degree of the block B reached 40, a toluene solution of 189 mmol of BAVE was added to continue polymerization. Monitoring by means of GPC was conducted to terminate the polymerization reaction at the time the polymerization degree of the block C reached about 20. The termination of the polymerization reaction was conducted by adding a 0.3% by mass aqueous solution of ammonia/methanol into the system.

The reaction mixture solution was concentrated, diluted with dichloromethane and washed 3 times with 0.6 M hydrochloric acid, once with an aqueous alkali solution and then 3 times with distilled water. The resultant organic phase was concentrated by an evaporator, and the resultant concentrated product was dissolved in tetrahydrofuran and dialyzed repeatedly in a methanol solvent using a semi-permeable membrane composed of cellulose to remove the monomers, thereby obtaining the intended triblock polymer. The identification of the compound was conducted by means of NMR and GPC. Mn was 23,000, and Mw/Mn was 1.20. A polymerization ratio of PTVE:PhOVE:MEVE:BAVE was 40:40:40:20.

The thus-obtained polymer was hydrolyzed in the same manner as in EXAMPLE 1 to obtain a polymer in the form of a free carboxylic acid.

In 21 parts by weight of tetrahydrofuran (THF) was dissolved 2.4 parts by weight of the resultant polymer in the form of a free carboxylic acid, and 1.8 parts by weight of Oil Yellow 129 (fat-soluble dye, product of Orient Chemical Industries Ltd.) was dissolved in 18 parts by weight of THF. These solutions were put together and converted into an aqueous phase by using 1.6 parts by weight of 1N sodium hydroxide and 34 parts by weight of water. THF was distilled off. As a result, dispersion was finely conducted. The dispersion was filtered under pressure through a filter having a pore size of 2 μm to obtain a dispersed material aqueous solution.

EXAMPLE 3

<Synthesis of ABC triblock copolymer, (PTVE 40-r-NpOVE 40)-b-MEVE 40-b-BAVE 20, comprised of 2-(phenylthio)ethyl vinyl ether (PTVE; block A), 2-(2-vinyloxyethoxy)naphthalene ((2-Np)VE; block A), diethylene glycol methyl vinyl ether (MEVE; block B) and ethyl 4-(2-vinyloxyethoxy)benzoate (BAVE; block C) (here, r and b are symbols indicating a random polymer and a block polymer, respectively)>

After the interior of a glass container equipped with a three-way stop-cock was purged with nitrogen, the container was heated to 250° C. under a nitrogen gas atmosphere to remove adsorbed water. After the system was returned to room temperature, 250 mmol of PTVE, 200 mmol of NpOVE, 761 mmol of ethyl acetate, 4.95 mmol of 1-isobutoxyethyl acetate and 490 ml of toluene were added to cool the reaction system. At the time the temperature within the system reached 0° C., 10 mmol of ethylaluminum sesquichloride (equimolar mixture of diethylaluminum chloride and ethylaluminum dichloride) was added to initiate polymerization. The molecular weight was periodically monitored by means of gel permeation chromatography (GPC). At the time the polymerization degree of the block A reached 80, a toluene solution of 194 mmol of MEVE was added to continue polymerization. Monitoring by means of GPC was conducted, and at the time the polymerization degree of the block B reached 40, a toluene solution of 189 mmol of BAVE was added to continue polymerization. Monitoring by means of GPC was conducted to terminate the polymerization reaction at the time the polymerization degree of the block C reached about 20. The termination of the polymerization reaction was conducted by adding a 0.3% by mass aqueous solution of ammonia/methanol into the system.

The reaction mixture solution was concentrated, diluted with dichloromethane and washed 3 times with 0.6 M hydrochloric acid, once with an aqueous alkali solution and then 3 times with distilled water. The resultant organic phase was concentrated by an evaporator, and the resultant concentrated product was dissolved in tetrahydrofuran and dialyzed repeatedly in a methanol solvent using a semi-permeable membrane composed of cellulose to remove the monomers, thereby obtaining the intended triblock polymer. The identification of the compound was conducted by means of NMR and GPC. Mn was 25,000, and Mw/Mn was 1.23. The polymerization ratio of PTVE:NpOVE:MEVE:BAVE was 40:40:40:20.

The thus-obtained polymer was hydrolyzed in the same manner as in EXAMPLE 1 to obtain a polymer in the form of a free carboxylic acid.

In 21 parts by weight of tetrahydrofuran (THF) was dissolved 2.4 parts by weight of the resultant polymer in the form of a free carboxylic acid, and 1.8 parts by weight of Oil Yellow 129 (fat-soluble dye, product of Orient Chemical Industries Ltd.) was dissolved in 18 parts by weight of THF. These solutions were put together and converted into an aqueous phase by using 1.6 parts by weight of 1N sodium hydroxide and 34 parts by weight of water. THF was distilled off. As a result, dispersion was finely conducted. The dispersion was filtered under pressure through a filter having a pore size of 2 μm to obtain a dispersed material aqueous solution.

COMPARATIVE EXAMPLE 1

<Synthesis of ABC triblock copolymer, PhOVE 80-b-MEVE 40-b-BAVE 20, comprised of 2-vinyloxyethoxybenzene (PhOVE; block A), diethylene glycol methyl vinyl ether (MEVE; block B) and ethyl 4-(2-vinyloxyethoxy)benzoate (BAVE; block C) (here, b is a symbol indicating a block polymer)>

After the interior of a glass container equipped with a three-way stop-cock was purged with nitrogen, the container was heated to 250° C. under a nitrogen gas atmosphere to remove adsorbed water. After the system was returned to room temperature, 435 mmol of PhOVE, 761 mmol of ethyl acetate, 4.95 mmol of 1-isobutoxyethyl acetate and 490 ml of toluene were added to cool the reaction system. At the time the temperature within the system reached 0° C., 10 mmol of ethylaluminum sesquichloride (equimolar mixture of diethylaluminum chloride and ethylaluminum dichloride) was added to initiate polymerization. The molecular weight was periodically monitored by means of gel permeation chromatography (GPC). At the time the polymerization degree of the block A reached 80, a toluene solution of 194 mmol of MEVE was added to continue polymerization. Monitoring by means of GPC was conducted, and at the time the polymerization degree of the block B reached 40, a toluene solution of 189 mmol of BAVE was added to continue polymerization. Monitoring by means of GPC was conducted to terminate the polymerization reaction at the time the polymerization degree of the block C reached about 20. The termination of the polymerization reaction was conducted by adding a 0.3% by mass aqueous solution of ammonia/methanol into the system.

The reaction mixture solution was concentrated, diluted with dichloromethane and washed 3 times with 0.6 M hydrochloric acid, once with an aqueous alkali solution and then 3 times with distilled water. The resultant organic phase was concentrated by an evaporator, and the resultant concentrated product was dissolved in tetrahydrofuran and dialyzed repeatedly in a methanol solvent using a semi-permeable membrane composed of cellulose to remove the monomers, thereby obtaining the intended triblock polymer. The identification of the compound was conducted by means of NMR and GPC. Mn was 23,000, and Mw/Mn was 1.19. The polymerization ratio of PhOVE:MEVE:BAVE was 80:40:20.

The thus-obtained polymer was hydrolyzed in the same manner as in EXAMPLE 1 to obtain a polymer in the form of a free carboxylic acid.

In 21 parts by weight of tetrahydrofuran (THF) was dissolved 2.4 parts by weight of the resultant polymer in the form of a free carboxylic acid, and 1.8 parts by weight of Oil Yellow 129 (fat-soluble dye, product of Orient Chemical Industries Ltd.) was dissolved in 18 parts by weight of THF. These solutions were put together and converted into an aqueous phase by using 1.6 parts by weight of 1N sodium hydroxide and 34 parts by weight of water. THF was distilled off. As a result, dispersion was successfully conducted. The dispersion was filtered under pressure through a filter having a pore size of 2 μm to obtain a dispersed material aqueous solution.

<Evaluation>

(Light Fastness)

In order to confirm light fastness in the polymers synthesized in the above-described EXAMPLES and COMPARATIVE EXAMPLE, the following experiment was carried out.

More specifically, the dispersed material aqueous solutions prepared in EXAMPLES 1 to 3 and COMPARATIVE EXAMPLE 1 were separately applied to plain paper (PB paper, product of Canon Inc.) by means of K CONTROL COATER K202 manufactured by RK Print Coat instruments Co., and the thus-coated paper was left to stand overnight at room temperature to dry it. In such a manner, 3 coated samples were provided for each of them.

After each of the paper samples prepared by respectively applying the polymers of EXAMPLES 1 to 3 and COMPARATIVE EXAMPLE 1 was exposed to ultraviolet rays, whose main wavelengths were 185 nm and 254 nm, for 4 hours by means of an UV irradiation apparatus UV-208 manufactured by Technovision Inc. under the condition where a light-screening portion composed of a polyimide film had been formed on a part of the coated surface of the paper sample, discoloration of the coated paper was visually observed, thereby evaluating the coated paper sample as to light fastness. The results are shown in Table 1.

Incidentally, the evaluation of the coated paper sample as to light fastness was made by the following sensory evaluation, and the results are indicated with the average value of 3 samples as to each polymer.

5: No discoloration was observed;
4: Discoloration was barely visually observed by comparison with the light-screening portion of the exposed paper sample;
3: Discoloration was barely observed by comparison with an unexposed paper sample;
2: Discoloration was clearly observed by
1: Tint was clearly different. comparison with an unexposed paper sample;

TABLE 1

| EX. | Polymer | Sensory evaluation |
| --- | --- | --- |
| EX. 1 | PTVE 80-b-MEVE 40-b-BAVE 20 | 4.3 |
| EX. 2 | (PTVE 40-r-PhOVE 40)-b-MEVE 40-b-BAVE 20 | 3.7 |
| EX. 3 | (PTVE 40-r-NpOVE 40)-b-MEVE 40-b-BAVE 20 | 3.7 |
| COMP EX. 1 | PhOVE 80-b-MEVE 40-b-BAVE 20 | 1.3 |

As apparent from Table 1, it is understood that in EXAMPLES of the present invention, discoloration was at such a level as to be barely observed in any case, whereas discoloration was almost clearly observed in COMPARATIVE EXAMPLE.

(Suitability for Ink-jet)

In order to confirm performance in application to ink-jet, the dispersed material aqueous solutions obtained in the respective EXAMPLES were used to prepare inks, and each of the inks was charged into an ink tank of a BUBBLE JET (registered trademark) printer (trade name: BJF800, manufactured by Canon Inc.) and ejected on plain paper, thereby confirming suitability for ink-jet.

It was confirmed that all the inks according to EXAMPLES are successfully ejected and sufficiently usable as ink-jet inks.

Further, with respect to the following EXAMPLES, in which a pigment was used as a coloring material to prepare an ink, the ejection performance through an ink-jet head was likewise confirmed. As a result, both EXAMPLES 4 and 5 were good in the dispersibility of the pigment, and good ejection property could be confirmed like EXAMPLES 1 to 3.

EXAMPLE 4

A dispersed material aqueous solution was obtained in the same manner as in EXAMPLE 1 except that 1.8 parts by weight of MOGUL L (black pigment, product of Cabot Company) was used in place of 1.8 parts by weight of Oil Yellow 129 (fat-soluble dye, product of Orient Chemical Industries Ltd.) used in EXAMPLE 1.

EXAMPLE 5

A dispersed material aqueous solution was obtained in the same manner as in EXAMPLE 1 except that 1.8 parts by weight of Oil Blue N (C.I. Solvent Blue 14, product of Aldrich Chemical Co., Inc.) was used in place of 1.8 parts by weight of Oil Yellow 129 (fat-soluble dye, product of Orient Chemical Industries Ltd.) used in EXAMPLE 1.

As described above, the resin-containing compositions according to the present invention are excellent in storability and light fastness and suitably applicable to application fields of ink-jet.

This application claims priority from Japanese Patent Application No. 2005-170137 filed Jun. 9, 2005, which is hereby incorporated by reference herein.

What is claimed is:

1. An ink composition comprising:
   a solvent;
   water;
   a coloring material insoluble in the solvent; and
   a block polymer compound having a repeating structural unit represented by the following general formula:

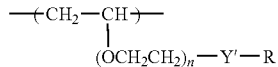

wherein Y' is a sulfur atom,
   wherein R is a linear or branched alkyl group having 3 to 15 carbon atoms, which may be substituted, or an aromatic ring which may be substituted, or a structure in which at most 3 fused rings are substituted or unsubstituted, or a structure in which at most 3 aromatic rings are substituted or unsubstituted and are bonded via a single bond, and n is an integer from 1 to 15,
   wherein the block polymer compound has a hydrophobic block segment and a hydrophilic block segment, and wherein the coloring material is included in the block polymer compound, and
   wherein the repeating structural unit represented by the general formula is arranged in the hydrophobic block segment.

2. The ink composition according to claim 1, wherein the hydrophobic block segment has a copolymer comprised of the repeating structural unit represented by the general formula and a repeating structural unit having an aromatic ring structure selected from the group consisting of a phenyl group, a biphenyl group and naphthyl group.

3. The ink composition according to claim 1, wherein the coloring material is an oil-soluble dye.

4. The ink composition according to claim 1, wherein R is a linear or branched alkyl group having 3 to 15 carbon atoms, which may be substituted.

5. A liquid application method comprising the steps of:
   providing the ink composition according to claim 1, and
   applying the ink composition to a recording medium.

6. The liquid application method according to claim 5, wherein the application of the ink composition to the recording medium is conducted by an ink-jet head.

7. A liquid application apparatus comprising means for applying the ink composition according to claim 1 to a recording medium.

8. An ink composition comprising:
   a solvent;
   water;
   a coloring material insoluble in the solvent; and
   a block polymer compound having a hydrophobic block segment and a hydrophilic block segment, the hydrophobic block segment having a repeating structural unit represented by the following general formula:

wherein Y' is a sulfur atom, and
   wherein R is an aromatic ring which may be substituted, or a structure in which at most 3 fused rings are substituted or unsubstituted, or a structure in which at most 3 aromatic rings are substituted or unsubstituted and are bonded via a single bond, and n is an integer from 1 to 15.

9. The ink composition according to claim 8, wherein R is an aromatic ring which may be substituted.

10. The ink composition according to claim 8, wherein R is a structure in which at most 3 fused rings are substituted or unsubstituted.

11. The ink composition according to claim 8, wherein R is a structure in which at most 3 aromatic rings are substituted or unsubstituted and are bonded via single bond.

12. An ink composition comprising:
    a solvent;
    water;
    a coloring material insoluble in the solvent; and
    a block polymer compound having a hydrophobic block segment and a hydrophilic block segment, the hydrophobic block segment being represented by the following general formula:

wherein Y' is S—S, and
   wherein R is a naphthyl group, and n is an integer from 1 to 15.

* * * * *